United States Patent [19]

Bareich

[11] Patent Number: 4,943,466
[45] Date of Patent: Jul. 24, 1990

[54] PLASTIC MOLDING

[75] Inventor: Gerry Bareich, Tecumseh, Canada

[73] Assignee: Automotive Moulding Company, Warren, Mich.

[21] Appl. No.: 916,359

[22] Filed: Oct. 7, 1986

[51] Int. Cl.⁵ .................................. E06B 7/16
[52] U.S. Cl. ............................. 428/122; 49/475; 49/490; 428/31; 428/358
[58] Field of Search ............. 49/490, 475; 428/31, 428/122, 358

[56] References Cited

U.S. PATENT DOCUMENTS

| | | | |
|---|---|---|---|
| 3,982,780 | 9/1976 | Keith | 428/31 X |
| 4,018,022 | 4/1977 | Fink | 49/DIG. 1 X |
| 4,117,034 | 9/1978 | Steffancin | 525/64 |
| 4,138,132 | 2/1979 | Doyle | 428/31 X |
| 4,141,879 | 2/1979 | McCarroll | 525/424 X |
| 4,214,753 | 7/1980 | Haber et al. | 428/187 X |
| 4,220,681 | 9/1980 | Narita | 428/31 |
| 4,300,316 | 11/1981 | Ficurilli | 49/493 X |
| 4,301,255 | 11/1981 | Korpman | 525/95 X |
| 4,358,482 | 11/1982 | Jubelt | 427/284 X |
| 4,411,941 | 10/1983 | Azzola | 428/122 |
| 4,449,014 | 5/1984 | Brezinsky | 428/336 X |
| 4,464,432 | 8/1984 | Dost et al. | 428/280 |
| 4,465,804 | 8/1984 | Sorensen | 524/505 |
| 4,475,975 | 10/1984 | Talley et al. | 156/240 X |
| 4,513,044 | 4/1985 | Shigeki et al. | 49/490 X |
| 4,530,186 | 7/1985 | Guillon | 49/441 |
| 4,531,326 | 7/1985 | Ballocca et al. | 425/466 X |
| 4,557,857 | 12/1985 | Sorensen | 524/440 X |
| 4,582,872 | 4/1986 | Hudgin et al. | 524/439 |
| 4,680,343 | 7/1987 | Lee | 525/146 X |
| 4,835,031 | 5/1989 | Schroder et al. | 428/122 |

*Primary Examiner*—Henry F. Epstein
*Attorney, Agent, or Firm*—Dykema Gossett

[57] ABSTRACT

Compounding of a thermoplastic alloy material capable of being bonded to a metal for use in automotive weather sealing applications.

2 Claims, 5 Drawing Sheets

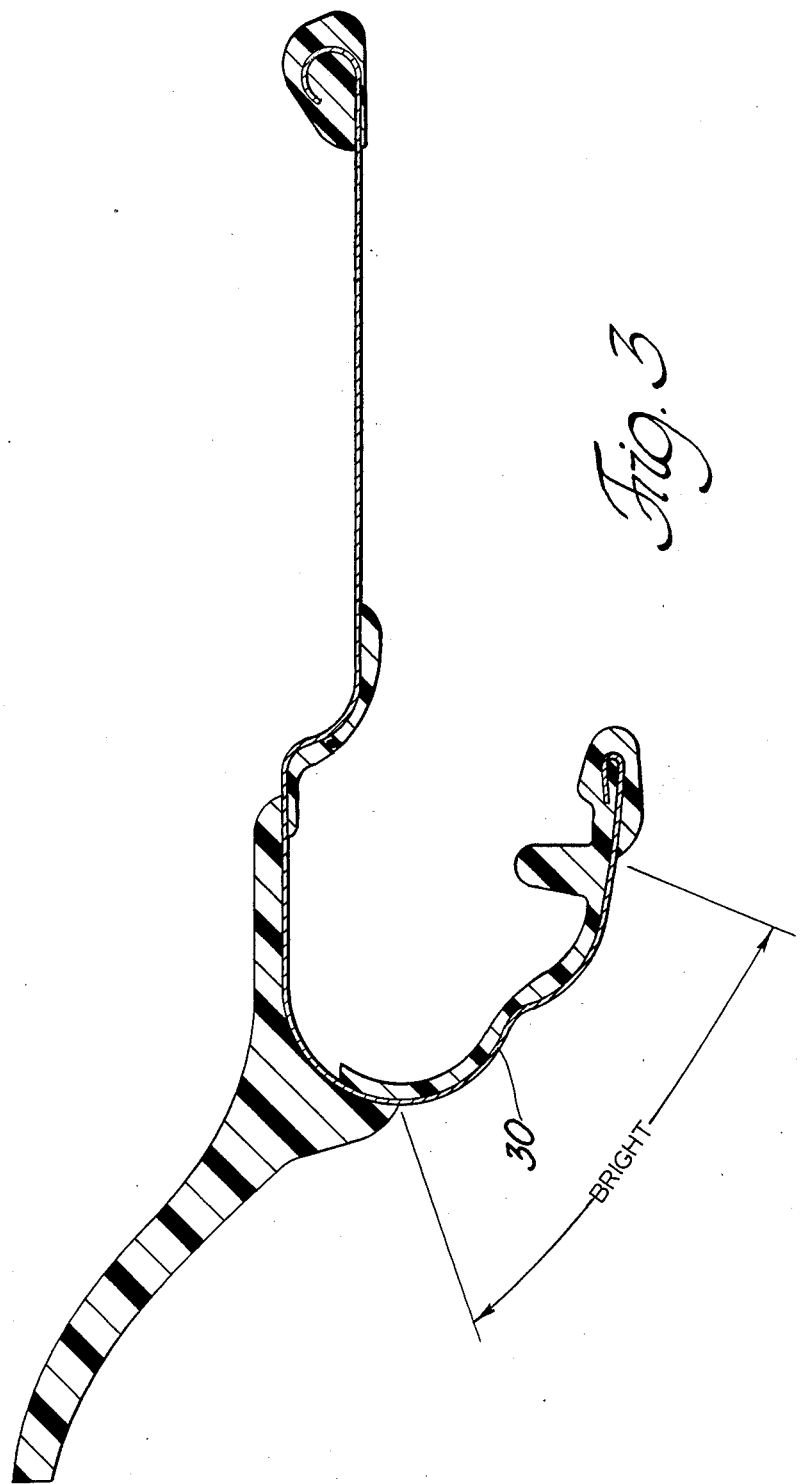

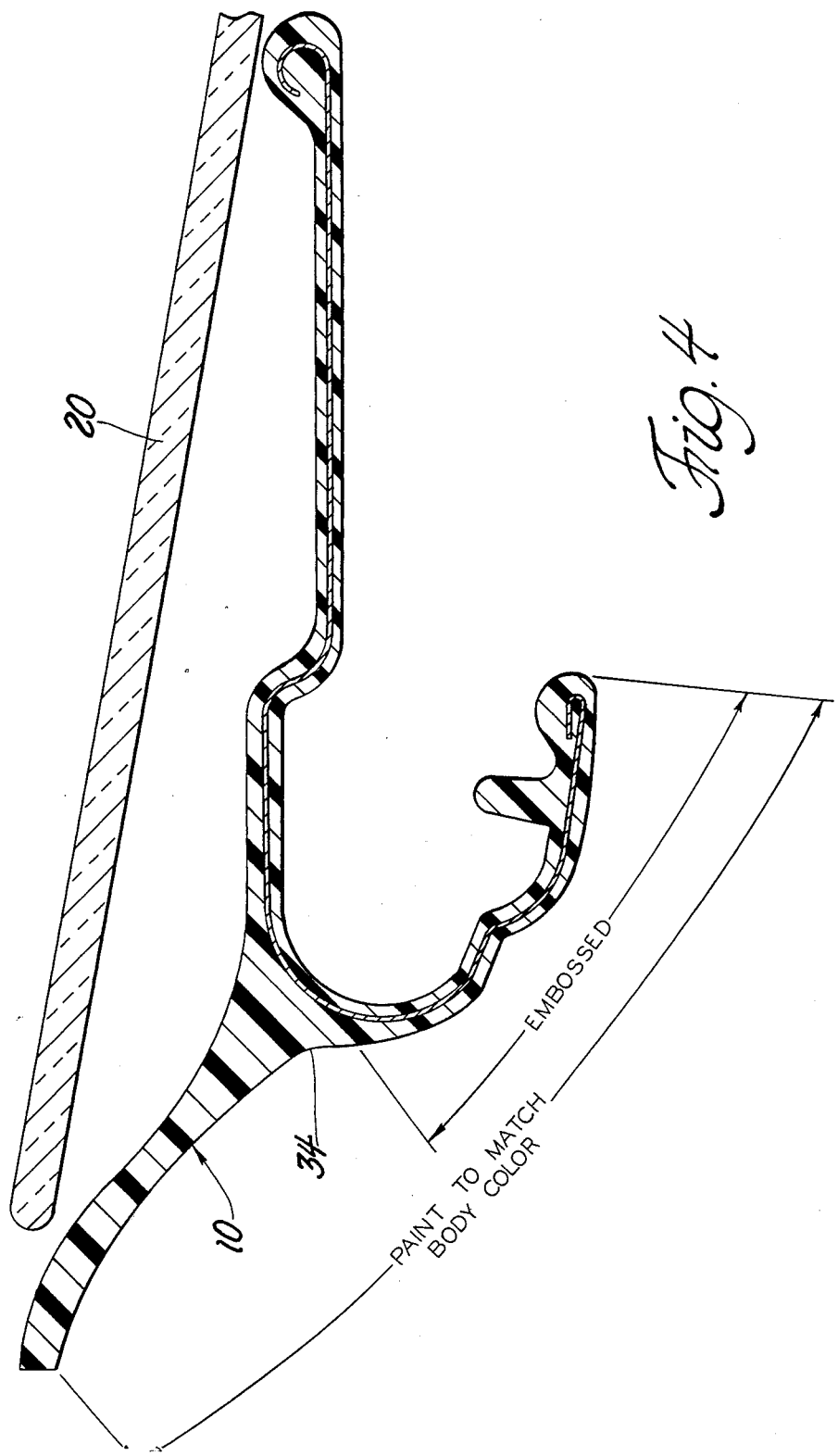

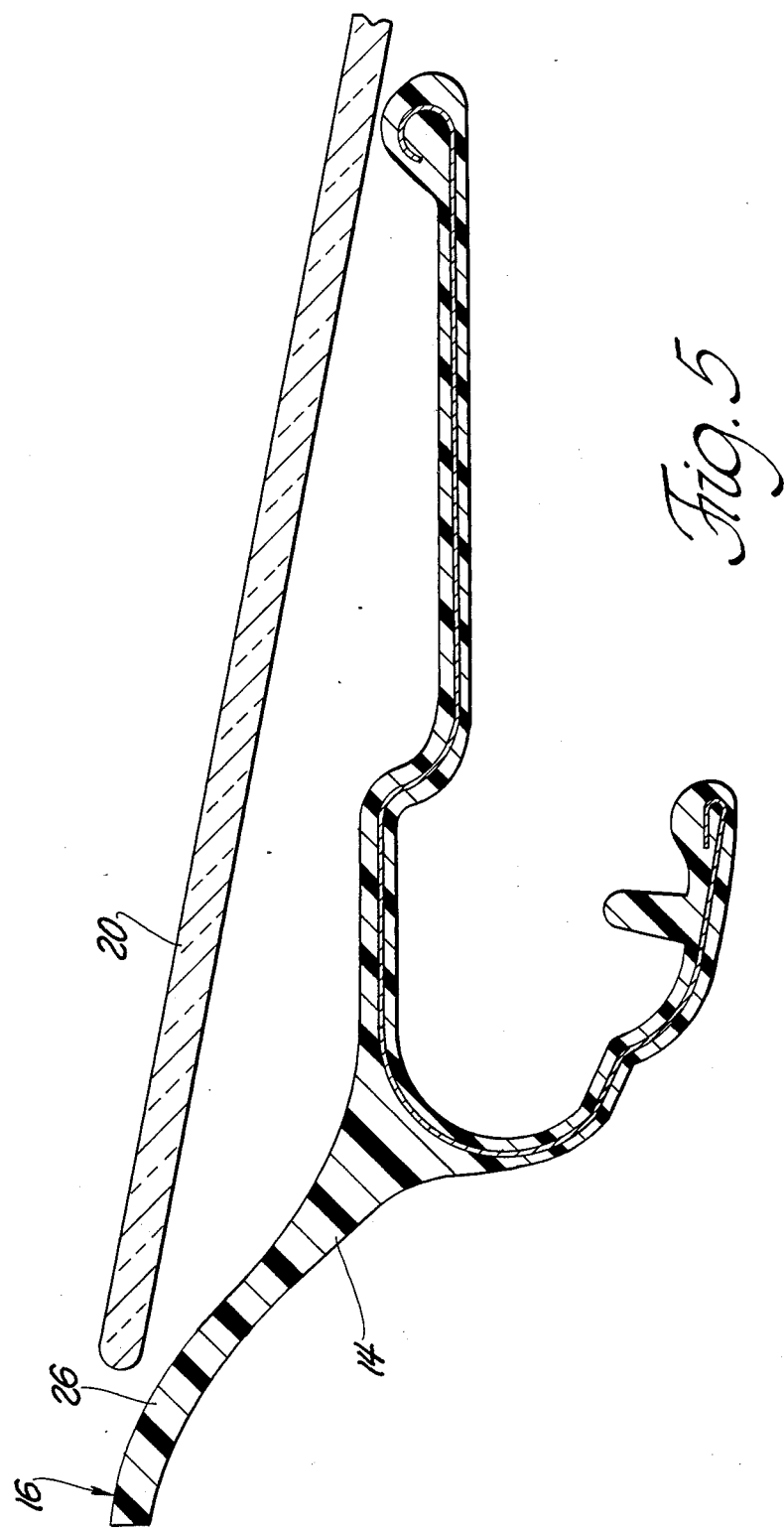

PLASTIC MOLDING

The subject invention relates to a thermoplastic alloy material bonded to a metal to manufacture weather sealing automotive moldings. More particularly, this invention relates to a co-extrusion of plastic referred to as a thermoplastic alloy and metal where the thermoplastic alloy is totally free of any vulcanizable rubber.

In the prior art, vulcanizable rubber compounds have been bonded to metal for this purpose. However, in order to achieve a sliding effect with respect to the glass, it has been necessary to apply a flocking material to the surface of the rubber in contact with moving glass. Flock is extruded polyester fibre with a breaking tenacity of 3.8 to 6 grams per denier, which is then cut into lengths of 0.025 inch to 0.040 inch. This flocking is then electrostatically applied to the rubber which has been pre-sprayed with adhesive. The fibre is passed onto a high voltage D.C. plate, which gives a positive charge to the fibre. This charged fibre is then sifted onto the adhesive-coated rubber (which has a negative charge) like flour is sifted through a flour sifter. This results in fibre standing on end in the adhesive.

One of the problems in this prior art method is that the range of thickness coating of rubber on metal is severely limited. Typical rubber thickness ranges on small metal profiles are 0.025 inch plus or minus 0.008 inch to 0.600 inch plus or minus 0.1 inch.

Accordingly, it is an object of this invention to provide thermoplastic alloy coatings on small metal profiles with thinner thickness, such as 0.015 inch plus or minus 0.003 inch to 0.600 inch plus or minus 0.030 inch.

It is also another object of this invention to selectively coat the metal profile with a thermoplastic alloy material, i.e., not all the metal is coated but some is left uncoated.

In the prior art, the type of rubber used in automotive moldings necessitates the use of only black pigment to obtain ozone resistance. Without the high level of black pigment, the rubber degrades in the presence of ozone, which is present in the atmosphere. The type of rubber processing equipment used results in poor color control and gloss control on the part.

Accordingly, it is another object of this invention to provide a thermoplastic alloy material that does not have ozone resistance problems; that does not require high levels of black to get a black color; that can be colored in any other color that is desired; and that is capable of control of the gloss level from matte finish (low gloss) to shiny (high gloss).

In the prior art, the reduction of friction between the glass and rubber moldings can only be accomplished by using flocking which is expensive.

Accordingly, it is a further object of this invention to provide a thermoplastic alloy coating material capable of sliding on glass without flocking by receiving a polyurethane slip coat bonded to the thermoplastic alloy material.

In the prior art, paint coatings have also been developed which can bond to plastics common on the fascias of cars, which at this point, do not bond to vulcanizable rubber.

Accordingly, it is a further object of this invention to provide a thermoplastic alloy coating to small metal profiles having a high temperature resistance (which is necessary for curing the paint) and capable of bonding to paints used on plastics common on the fascias of cars.

These and other objects of this invention may be more fully understood from the following specifications and claims. These and other objects of this invention are achieved by the compounding a polyvinyl chloride resin with a low temperature plasticizer; a stabilizer, such as a barium/cadmium stabilizer; a co-stabilizer, such as epoxidized soybean oil; a filler, such as talc; a lubricant, such as stearic acid; a modifier; such as acrylonitrile rubber; a pigment; and a fungicide, such as an arsenic complex. The alloy, initially compounded into $\frac{1}{8}$ inch cube material, is extruded and applied to desired parts of the metal profile. Flocking can be eliminated by the application of a polyurethane slip coat, which is provided to reduce friction between a glass window and the coated metal profile.

BRIEF DESCRIPTION OF THE DRAWINGS

FIG. 3 is a cross-sectional view of a small metal profile coated with a thermoplastic alloy material in another alternative embodiment of this invention.

FIG. 4 is a cross-sectional view of a small metal profile coated with a thermoplastic alloy material in another alternative embodiment of this invention.

FIG. 5 is a cross-sectional view of an apparatus incorporating the coated profile shown in FIG. 1, positioned with respect to a sliding glass curtain.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein are for the purpose of description and not of limitation.

Figure 1:
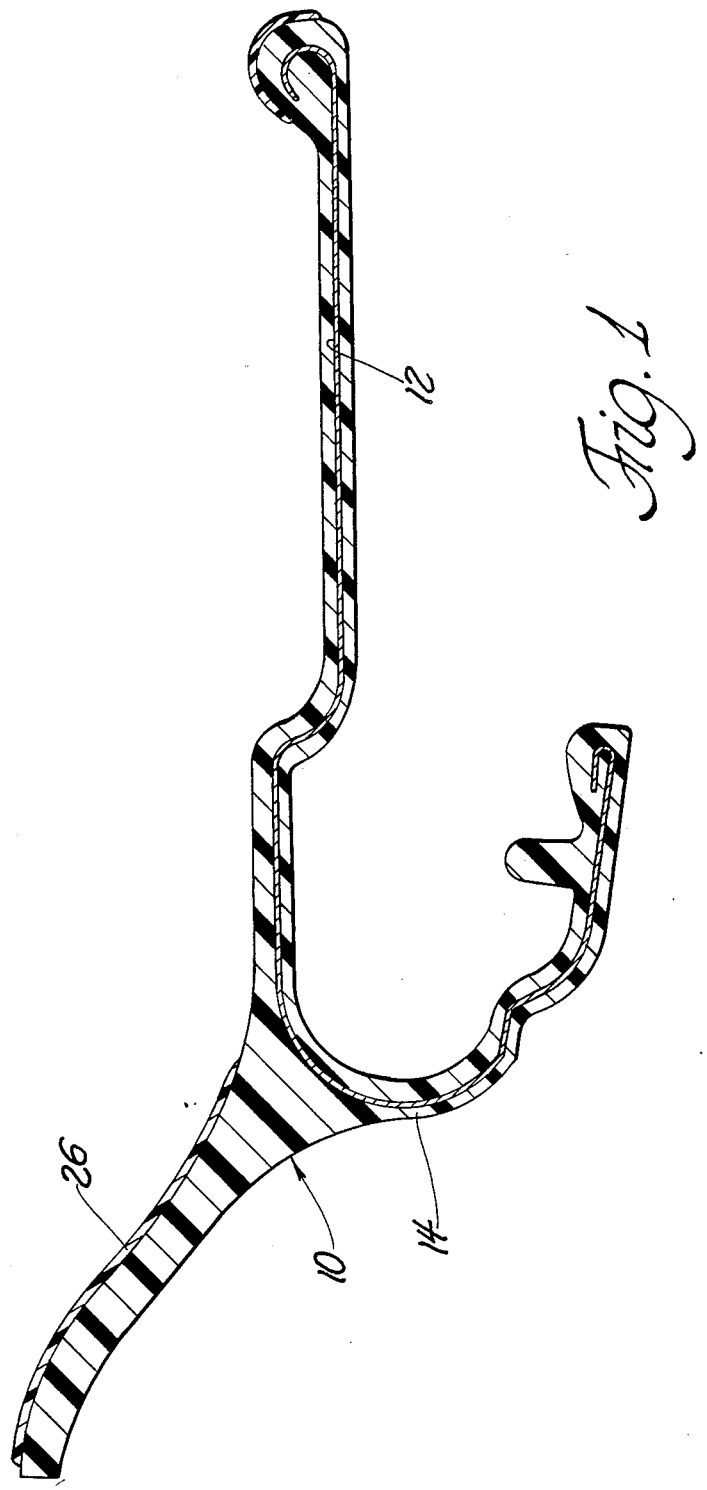
FIG. 1 is a cross-sectional view of a small metal profile coated with a thermoplastic alloy material in a preferred embodiment of this invention.

Referring now to FIG. 1 the preferred embodiment of this invention is shown generally at Numeral 10. A small metal profile 12 is coated with a coating 14 of a thermoplastic alloy material. An extrusion coating 26 is made of a rigid polyvinyl chloride extrusion bonded to the coating 14. This extrusion coating has thickness of 0.005 inch (0.127 millimeters).

In FIG. 1 glass (not shown) is operable to slide on the coating 26 that is bonded to the coating 14.

Figure 2:
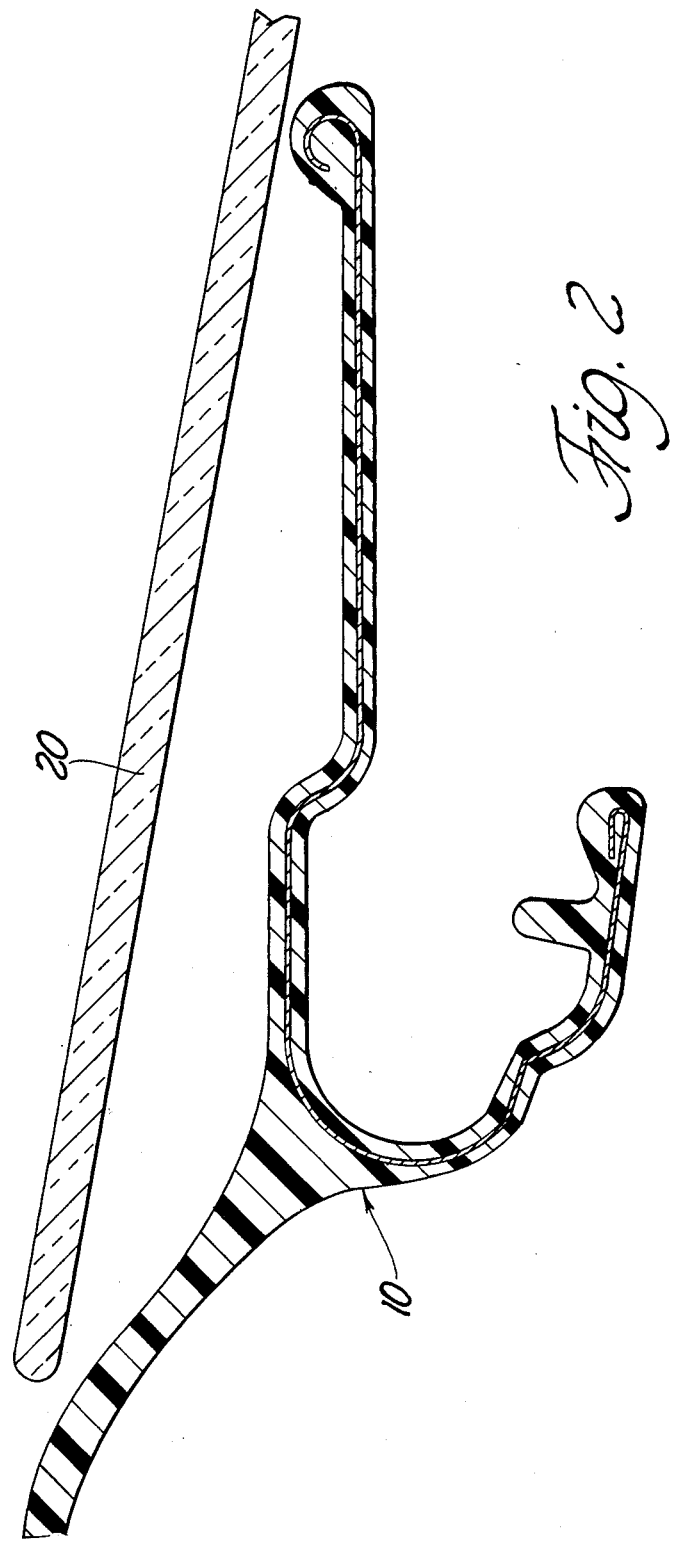
FIG. 2 is a cross-sectional view of a small metal profile coated with a thermoplastic alloy material in an alternative embodiment of this invention.

FIG. 2 shows an alternative embodiment of this invention in juxtaposition to moving glass indicated at Numeral 20.

FIG. 3 shows a further alternative embodiment of this invention with a bright metal surface free of any elastomeric material shown at Numeral 30.

FIG. 4 shows a further alternative embodiment of this invention with an embossed finish and a surface operable to be painted at Numeral 34.

FIG. 5 shows the preferred embodiment of this invention in juxtaposition with respect to movable glass 20.

The preferred ingredients of the co-extruded alloy 14 of the thermoplastic alloy material are as follows:

1. Polyvinyl chloride resin, medium molecular weight 68 to 70, such as that made by Esso Chemical of Canada.

2. Low temperature plasticizer, such as that made by C. P. Hall, of Chicago, Ill., or Emery Chemical of New Jersey.

3. Stabilizer, such as barium/cadmium stabilizer, sold by Ferro of Chicago, Ill.

4. Co-stabilizer, which is an epoxidised soybean oil, such as G62, made by G. P. Hall of Chicago, Ill.

5. Filler, which is talc, calcium carbonate, or silica, such as that made by Thompson Weimman of Georgia.

6. Lubricant, which is paraffin wax, metallic soap, or stearic acid, such as that purchased from Henkel of West Germany.

7. Modifier, which is rubber.

8. Pigment which gives the color to the material and is brought from Americhem of New York.

9. Fungicide, which is an arsenic complex, made by Ventron, a division of Morton Throbol of Massachusetts.

The preferred quantitative factors are as follows:

1. PVC, 100 parts.
2. Plasticizer, 20 to 80 parts.
3. Stablizer, barium/cadmium, 2 to 3 parts.
4. Co-stabilizer, epoxidized soybean oil, 4 to 5 parts.
5. Filler, calcium carbonate, talc, or silica, 0 to 100 parts.
6. Lubricant, paraffin wax 0.1 to 0.3; metallic soap 0.2 to 0.4; stearic acid 0.25 to 0.65 parts.
7. Modifier, rubber, 10 to 100 parts.
8. Pigment, 0.5 to 3.5 parts, depending on color intensity desired.
9. Fungicide, arsenic complex, 2 to 4 parts.

Preferred compounding:

A high-intensity mixer may be utilized. A preferred such mixer is that made by Henschel Corporation of the Federal Republic of West Germany.

In the first step of compounding, the polyvinyl chloride polymer resin is put in the mixer and is heated to a range of 180 degrees to 200 degrees Fahrenheit. A plasticizer is added, slowly heating the mixture to 235 degrees Fahrenheit for a preferred period of 1½ minutes.

Liquid stabilizers and co-stabilizers are then added, still maintaining the temperature of 235 degrees Fahrenheit, for a period of 10 to 15 seconds.

A solid filler is then added, still maintaining the mixture temperature at 235 degrees Fahrenheit for a period of approximately 30 seconds.

A liquid fungicide is added in a period of a few seconds. A lubricant is then added for an additional period of a few seconds.

Subsequently, color concentrate is added. Further subsequently, rubber is added during a period of approximately 5 seconds.

Further subsequently, the mixture is dumped into a cooling mixture and is cooled down to 100 degrees Fahrenheit for a period of approximately 5 minutes.

The resultant product is then placed in a compounding line, either single screw, turn screw, or continuous mixer compounding equipment. Typical extrusion temperatures are 370 degrees Fahrenheit.

The resultant product is in the form of cubes of ⅛ inch on a side or cylindrical pellets or pills.

The resultant thermoplastic alloy cubes are then remelted and applied to the metal as shown in FIGS. 1–5.

Flocking of the thermoplastic can be done in a manner similar to the flocking of rubber; or alternatively, a slip coating can be placed on the surface of the thermoplastic.

Compounding can be summarized as follows:

Ingredients are weighed in a scale, then placed in a high intensity mixer, subsequently transferred to a cooling mixer, subsequently transferred to a holding bin, subsequently transferred to a melting compounder, subsequently transferred to a shaping die, subsequently transferred to a cooling entity, and then packed or boxed.

The product then can be utilized as a thermoplastic alloy component of a co-extruded product bondable to metal in a manner well known in the art.

The thermoplastic alloy can be covered with a polyurethane slip coating to prevent binding when the resultant co-extrusion is placed next to glass.

I claim:

1. In a vehicle, a window assembly comprising:
   a glass member being a vehicle window movable between upper and lower positions;
   a weather strip which provides a sliding contact surface for said glass member, said weather strip comprising a metal portion and a plastic portion bonded to said metal portion, said weather strip having a first face facing towards said glass member and a second face facing away from said glass member, said plastic portion including a thermoplastic material; and
   coating means bonded to said first face of said plastic portion for providing sliding contact with said glass member;
   said second face having a portion of bare metal.

2. In a vehicle, a window assembly comprising:
   a glass member being a vehicle window movable between upper and lower positions;
   a weather strip which provides a sliding contact surface for said glass member, said weather strip comprising a metal portion and a plastic portion bonded to said metal portion, said weather strip having a first face facing towards said glass member and a second face facing away from said glass member, said plastic portion including a thermoplastic material; and
   coating means bonded to said first face of said plastic portion for providing sliding contact with said glass member;
   said second face being embossed and painted.

* * * * *